United States Patent
Satou et al.

[11] Patent Number: 6,026,944
[45] Date of Patent: Feb. 22, 2000

[54] WET MULTI-PLATE CLUTCH

[75] Inventors: Shinji Satou, Hamamatsu; Kikuo Mochizuki, Inasa-gun, both of Japan

[73] Assignee: Shin Nippon Wheel Industries Co., Ltd., Shizuoka, Japan

[21] Appl. No.: 09/270,275

[22] Filed: Mar. 16, 1999

[30] Foreign Application Priority Data

Mar. 25, 1998 [JP] Japan .................................. 10-098314

[51] Int. Cl.$^7$ ...................................................... F16D 13/69
[52] U.S. Cl. ...................................... 192/70.28; 192/70.2
[58] Field of Search .............................. 192/70.12, 70.19, 192/70.2, 70.28; 188/71.5, 72.3, 73.38

[56] References Cited

U.S. PATENT DOCUMENTS

| | | | |
|---|---|---|---|
| 3,791,500 | 2/1974 | Stefanutti | 192/70.28 X |
| 3,994,378 | 11/1976 | Schwabe et al. | 192/70.28 |
| 4,940,124 | 7/1990 | Galuska et al. | 192/70.28 |
| 5,137,131 | 8/1992 | Enomoto | 192/70.28 X |

FOREIGN PATENT DOCUMENTS 62-67333  3/1987  Japan .

*Primary Examiner*—Richard M. Lorence
*Attorney, Agent, or Firm*—Nikaido, Marmelstein, Murray & Oram LLP

[57] ABSTRACT

A wet multi-plate clutch includes a clutch outer connected to an input member, a clutch inner relatively rotatably disposed within the clutch outer and connected to an output member, a plurality of first friction plates axially slidably spline-fitted to an inner peripheral wall of the clutch outer and accommodated within the clutch outer, a plurality of second friction plates axially slidably spline-fitted to an outer peripheral wall of the clutch inner and superposed one on another alternately with the first friction plates, and a clamping device capable of clamping groups of the first and second friction plates axially to bring adjacent ones of the first and second friction plates into friction engagement with each other. In this wet multi-plate clutch, stopper devices are mounted at opposite ends of a spline groove in the clutch outer for limiting the distance of sliding movement of spline teeth of the group of the first friction plates. First spacing springs made of a spring steel plate are mounted to the spline teeth of the first friction plates, so that when the clutch is turned off, the first friction plates are pulled apart from one another to equal distances. Second spacing springs each formed of an annular wavy spring are also interposed between the second friction plates for pulling the second friction plates apart from one another to equal their distances which are equal to the distances when the clutch is turned off.

8 Claims, 8 Drawing Sheets

TURNED-ON STATE OF CLUTCH

TURNED-OFF STATE OF CLUTCH ($L_2 = L_1$)

TURNED-OFF STATE OF CLUTCH

WET MULTI-PLATE CLUTCH

BACKGROUND OF THE INVENTION

Field of the Invention

The present invention relates to a wet multi-plate clutch incorporated in a transmitting system for an agricultural tractor or the like and particularly, to an improvement in a wet multi-plate clutch which includes a clutch outer connected to one of an input member connected to a power source and an output member connected to a loading member, a clutch inner relatively rotatably disposed within the clutch outer and connected to the other of the input and output members, a plurality of first friction plates axially slidably spline-fitted to an inner peripheral wall of the clutch outer and accommodated within the clutch outer, a plurality of second friction plates axially slidably spline-fitted to an outer peripheral wall of the clutch inner and superposed one on another alternately with the first friction plates, and a clamping means capable of clamping groups of the first and second friction plates axially to bring adjacent ones of the first and second friction plates into friction engagement with each other.

Description of the Related Art

In such wet multi-plate clutch, when the clamping means is brought into a non-operative state, i.e., when the clutch is brought into a turned-off state, there is a tendency that a drag is produced between both the first and second friction plates by a tacking force of oil existing between the first and second friction plates. Such drag phenomenon obstructs the cutting-off of the transmission of power to some extent.

There is a conventionally known wet multi-plate clutch intended to prevent such drag phenomenon, in which spacing springs each comprising a coil spring for pulling the first friction plates apart from one another at the time of turning-off of the clutch are interposed between spline teeth of a plurality of first friction plates which are slidably spline-fitted to an inner peripheral wall of a clutch outer, for example, as disclosed in Japanese Patent Application Laid-open No. 62-67333. In such wet multi-plate clutch, when the clutch is turned off, the spacing springs pull the first friction plates apart from one another and pull the first and second friction plates apart from each other against a tacking force of oil existing between the first and second friction plates, so that the generation of a drag can be prevented to the utmost.

In such structure, however, the second friction plates spline-fitted over the clutch inner can be slid freely on the clutch inner even in the turned-off state of the clutch. Therefore, while one surface of each of the second friction plates is pulled apart from the first friction plate, the other surface is left in a state in which it remains in close contact with the first friction plate in many cases. Thus, the actual circumstances are that the present state of art in this field does not reach a stage in which the drag preventing effect can be satisfied.

SUMMARY OF THE INVENTION

Accordingly, it is an object of the present invention to provide a wet multi-plate clutch of the above-described type, in which a satisfactory drag preventing effect is achieved in the turned-off state of the clutch and moreover, which includes a drag preventing means having a simple structure and a good assemblability.

To achieve the above object, according to a first aspect and feature of the present invention, there is provided a wet multi-plate clutch comprising a clutch outer connected to one of an input member connected to a power source and an output member connected to a loading member, a clutch inner relatively rotatably disposed within the clutch outer and connected to the other of the input and output members, a plurality of first friction plates axially slidably spline-fitted to an inner peripheral wall of the clutch outer and accommodated within the clutch outer, a plurality of second friction plates axially slidably spline-fitted to an outer peripheral wall of the clutch inner and superposed one on another alternately with the first friction plates, and a clamping means capable of clamping groups of the first and second friction plates axially to bring adjacent ones of the first and second friction plates into friction engagement with each other, wherein the wet multi-plate clutch further includes first spacing springs interposed between the first friction plates for pulling the first friction plates apart from one another to equal distances therebetween, when the clutch is brought into a turned-off state in which the clamping means is non-operative, and second spacing springs interposed between the second friction plates for pulling the second friction plates apart from one another to equal distances between the second friction plates which are equal to the distances between the first friction plates, when the clutch is brought into the turned-off state, each of the first spacing springs being comprised of a U-shaped mounting portion for clamping spline teeth of the first friction plate in a direction of thickness of the first friction plate, and a pair of resilient blades which extend in a circumferential direction of the first friction plate from opposite side edges of a side plate of the mounting portion, each of the resilient blades being more spaced apart from the spline teeth at a location closer to a tip end thereof.

With the first feature, when the clutch is brought into the turned-off state, the first spacing springs pull the first friction plates apart from one another to the equal distances, and the second spacing springs pull the second friction plates apart from one another to the equal distances, which are set to be equal to the distances between the first friction plates pulled apart from one another by the first spacing springs. Therefore, the first and second friction plates can be pulled apart from one another against a tacking force of oil, and thus, it is possible to reliably prevent a drag between both the friction plates. Moreover, the first spacing springs can easily be mounted to the spline teeth of the first friction plates. It should be particularly noted that the resilient blades of the first spacing spring extend in a direction of the largest width of the spline teeth of the first friction plate. Thus, the length of the resilient blade can be ensured sufficiently in a range of the width of the spline teeth, and the spring constant of the resilient blade can be set at a relatively small value. Even if the first friction plate is worn, the generation of an excessive stress in the resilient blade can be avoided when the clutch is brought into the turned-on state, thereby enhancing the durability of the resilient blades.

According to a second aspect and feature of the present invention, in addition to the first feature, the pair of resilient blades are connected to the opposite side edges of each of an opposed pair of the side plates of the U-shaped mounting portion in each of the first spacing springs.

With the second feature, the resilient blades can be interposed between the first friction plates only by mounting the first spacing springs to every other first friction plates, leading to a decreased number of parts and thus to a decreased number of assembling steps, which can contribute to a reduction in cost.

According to a third aspect and feature of the present invention, in addition to the first or second feature, the resilient blade is formed into a trapezoidal shape in which the resilient blade is gradually narrower in width toward its tip end.

With the third feature, it is possible to set the spring constant of the resilient blade at a further small value, and when the clutch is turned on, the generation of an excessive stress in the resilient blades can effectively be inhibited, whereby the durability of the resilient blades can be enhanced.

According to a fourth aspect and feature of the present invention, in addition to any one of the first to third features, the spline teeth have a locking bore provided therein, while the side plate of the mounting portion has a locking claw which is formed thereon by cutting and rising, the locking claw being resiliently engaged into the locking bore, the locking claw being formed so that a tip end thereof is turned toward the tip end of the spline tooth.

With the fourth feature, the leaving of the first spacing spring from the spline teeth can be prevented by engagement of the locking claw on the side plate of the mounting portion with the locking bore in the spline tooth.

According to a fifth aspect and feature of the present invention, in addition to any one of the first to fourth features, the clutch outer is provided with a window which makes a spline groove in the clutch outer open radially outwards, and canopies which protrude from opposed side edges of the window to cover the resilient blades of the first spacing spring from the radial outside.

With the fifth feature, the radially outward leaving of the first spacing springs from the spline teeth can reliably be prevented by the canopies to sufficiently oppose a centrifugal force. Particularly, if the engagement of the locking claws on the side plates of the mounting portion with the locking bores in the spline teeth is used in combination with the canopies, the effect of preventing the leaving of the first spacing springs can be further enhanced.

According to a sixth aspect and feature of the present invention, in addition to any one of the first to fourth features, the clutch outer is provided with a window which makes the spline groove of the clutch outer open radially outwards, and a rib extending through a central portion of the window to cover the mounting portions of the first spacing springs from the radial outside.

With the sixth feature, the radially outward leaving of the first spacing springs from the spline teeth can reliably be prevented by the rib to sufficiently oppose a centrifugal force. Even in this case, if the engagement of the locking claws on the side plates of the mounting portion with the locking bores in the spline teeth is used in combination with the rib, the effect of preventing the leaving of the first spacing springs can be further enhanced.

According to a seventh aspect and feature of the present invention, in addition to the first feature, the clamping means comprises a pressure receiving plate locked to one of the clutch outer and the clutch inner to face an outermost side surface of the groups of the first and second friction plates, a pressing plate axially slidably carried on the clutch inner to face an innermost side surface of the groups of the first and second friction plates, and a clutch spring mounted to the clutch inner to bias the pressing plate toward the pressure receiving plate.

According to an eighth aspect and feature of the present invention, in addition to the first or seventh feature, the second spacing spring is formed of an annular wavy spring which is slidably fitted over an outer periphery of the clutch inner.

The above and other objects, features and advantages of the invention will become apparent from the following description of the preferred embodiment taken in conjunction with the accompanying drawings.

DETAILED DESCRIPTION OF THE PREFERRED EMBODIMENTS

Figure 1:
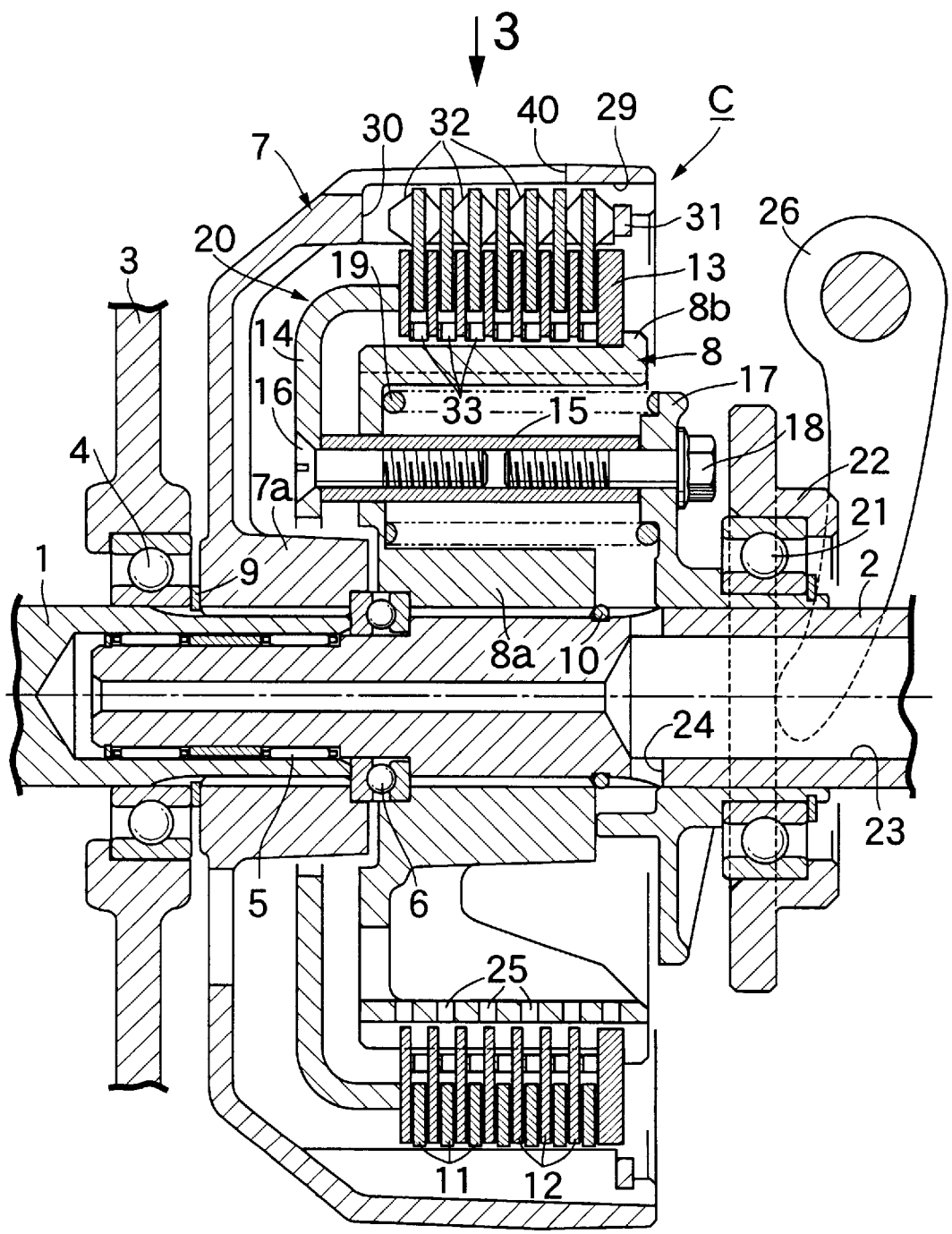
FIG. 1 is a vertical sectional view of a wet multi-plate clutch according to a first embodiment of the present invention.

A first embodiment of the present invention will be first described below. Referring to FIGS. 1 and 2, reference character C is a wet multi-plate clutch for an agricultural tractor or another vehicle. The wet multi-plate clutch C is interposed between an input shaft 1 (an input member) connected to a power source such as an engine and an output shaft 2 (an output member) connected to a main shaft of a transmission. The input shaft 1 is carried in a transmission case 3 with a ball bearing 4 interposed therebetween, and the output shaft 2 is relatively rotatably carried coaxially on the input shaft 1 with a needle bearing 5 and a thrust bearing 6 interposed therebetween.

The wet multi-plate clutch C includes a bottomed cylindrical clutch outer 7 with its one end surface opened toward the output shaft 2, and a cylindrical clutch inner 8 concentrically disposed within the clutch outer 7. A flange 8b is formed at an outer end of the clutch inner 8 which corresponds to an opened surface of the clutch outer 7. The clutch outer 7 has a boss 7a which is spline-coupled to the input shaft 1 between the ball bearing 4 and the thrust bearing 6, and the clutch inner 8 has a boss 8a which is spline-coupled to the output shaft 2 on the right of the thrust bearing 6. The axial movement of the boss 7a of the clutch outer 7 is limited by the thrust bearing 6 and a retaining ring 9 which is adjacent to the ball bearing 4 and locked on the input shaft 1, and the axial movement of the boss 8a of the clutch inner 8 is limited by the thrust bearing 6 and a retaining ring 10 locked on the output shaft 2.

A plurality of and an odd number (7 in the illustrated embodiment) of first friction plates 11 each having friction linings 11a bonded to opposite surfaces thereof are axially slidably spline-fitted to an inner peripheral wall of the clutch outer 7, and the same number of second friction plates 12 as the first friction plates 11 are axially slidably fitted over an outer peripheral wall of the clutch inner 8. In this case, the first and second friction plates 11 and 12 are disposed so that they are alternately superposed on each other, and so that the first friction plate 11 is disposed on the outermost side of a group of the first and second friction plates 11 and 12 and the second friction plate 12 is disposed on the innermost side of such group.

Further, a pressure receiving plate 13, which is opposed to the outermost side surface of the group of the first and second friction plates 11 and 12 and received on the flange 8b, is spline-fitted over the outer peripheral wall of the clutch inner 8, and a pressing plate 14 is mounted in an opposed relation to the innermost side surface of the group of the first and second friction plates 11 and 12. The pressing plate 14 is coupled by machine screws 16 to inner ends of a plurality of support shafts 15 (only one of them is shown in FIG. 1) which are disposed circumferentially to axially slidably extend through the clutch inner 8. An operating plate 17 slidably carried on an outer periphery of the output shaft 2 is coupled to an outer end of the support shaft 15 by a bolt 18, and a plurality of clutch springs 19 (only one of them is shown in FIG. 1) are mounted to the clutch inner 8 to surround the support shaft 15 for biasing the pressing plate 14 toward the pressure receiving plate 13 through the operating plate 17. Thus, the pressure receiving plate 13, the pressing plate 14, the support shaft 15 and the clutch springs 19 form a clamping means 20 for clamping the first and second friction plates 11 and 12 to bring them into frictional engagement with one another.

A release plate 22 is mounted to the operating plate 17 with a release bearing 21 interposed therebetween, and a clutch operating lever 26 swingably pivotted on the transmission case 3 is engaged with the release plate 22.

The output shaft 2 is provided with an oil passage 23 extending through an axial center thereof, and an oil bore 24 which permits the oil passage 23 to communicate with the inside of the clutch inner 8. A large number of oil bores 25 are provided in the peripheral wall of the clutch inner 8 to permit the inside and outside of the clutch inner 8 to communicate with each other. When an oil is fed from an oil pump (not shown) to the oil passage 23, it is passed through the oil bores 24 and 25 and supplied to the first and second friction plates 11 and 12 and other movable portions to lubricate and cool them.

Figure 2A:
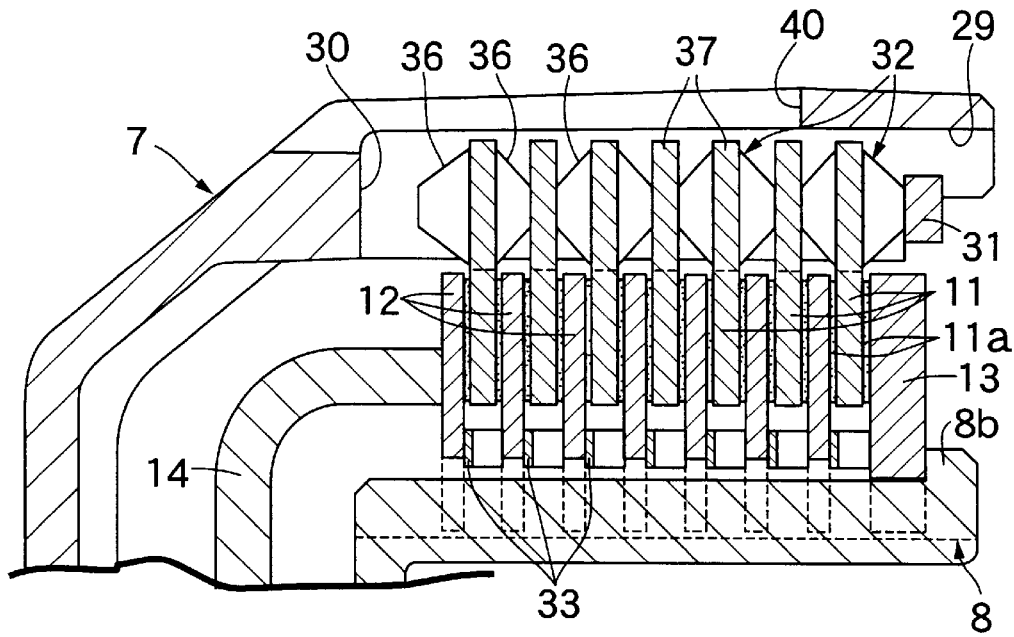
FIGS. 2A and 2B are enlarged views of an essential portion of the clutch, FIG. 2A showing a turned-on state of the clutch, and FIG. 2B showing a turned-off state of the clutch.

As shown in FIG. 2A, when the clutch operating lever 26 is brought into a non-operative state, the clutch C is brought into a turned-on state. In this case, the pressing plate 14 clamps the group of the first and second friction plates 11 and 12 by cooperation with the pressure receiving plate 13 by biasing forces of the clutch springs 19 to bring them into friction engagement with one another. Therefore, a rotational torque transmitted from the power source to the input shaft 1 can be transmitted sequentially via the clutch outer 7, the first friction plates 11, the second friction plates 12 and the clutch inner 8 to the output shaft 2 and further transmitted through a transmission (not shown) to driven wheels to drive the driven wheels.

Figure 2B:
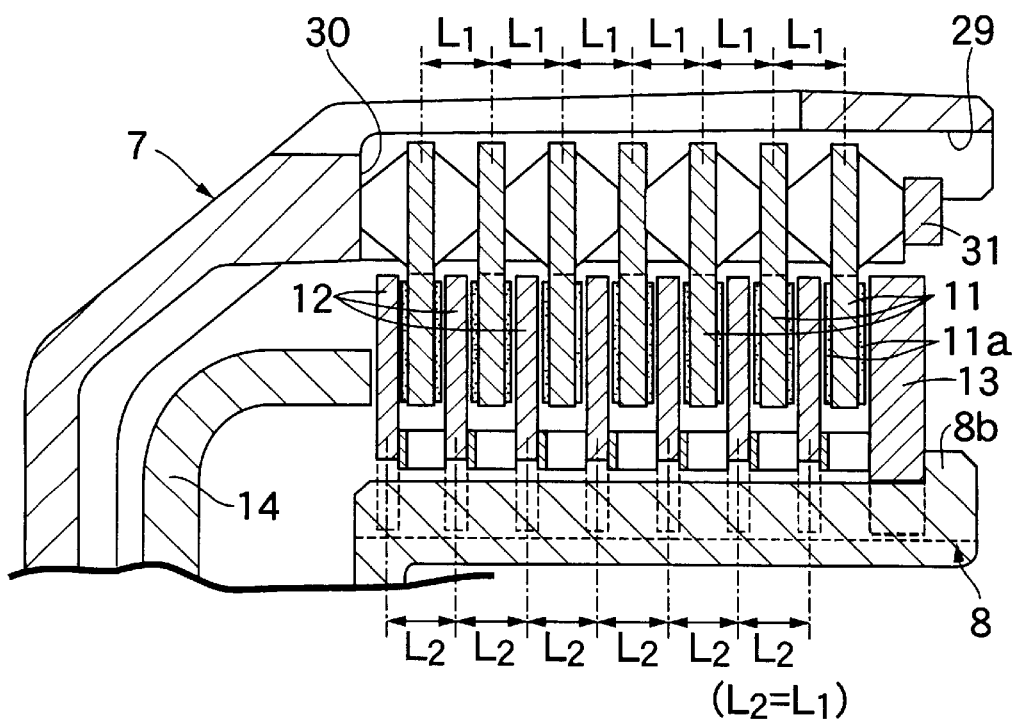

When the clutch operating lever 26 is operated to urge the operating plate 17 through the release plate 22, thereby retreating the pressing plate 14 against the biasing force of the clutch springs 19, as shown in FIG. 2B, the first and second friction plates 11 and 12 are released from the clamping forces of the pressing plate 14 and the pressure receiving plate 13, so that the frictional engagement between both the first and second friction plates 11 and 12 are released. Thus, the transmission of the power between both the first and second friction plates 11 and 12 is cut off, whereby the clutch C is brought into a turned-off state. At this time, the oil existing between the first and second friction plates 11 and 12 tends to produce a drag between both the first and second friction plates 11 and 12 by a tacking force of the oil. In order to prevent such drag phenomenon, a measure which will be described below is taken.

As shown in FIG. 2, a spline groove 29 defined in the inner peripheral wall of the clutch outer 7 is closed at its opposite ends by an end wall 30 integral with the clutch outer 7 and a retaining ring 31 locked on the inner periphery of an outer end of the clutch outer 7. The end wall 30 and the retaining ring 31 form a stopper means for limiting the distance of axially sliding movement of the group of the first friction plates 11 to a constant value. First spacing springs 32 are disposed between the end wall 30, the retaining ring 31 and the first friction plates 11 for biasing them in spacing directions from one another.

Figure 3:
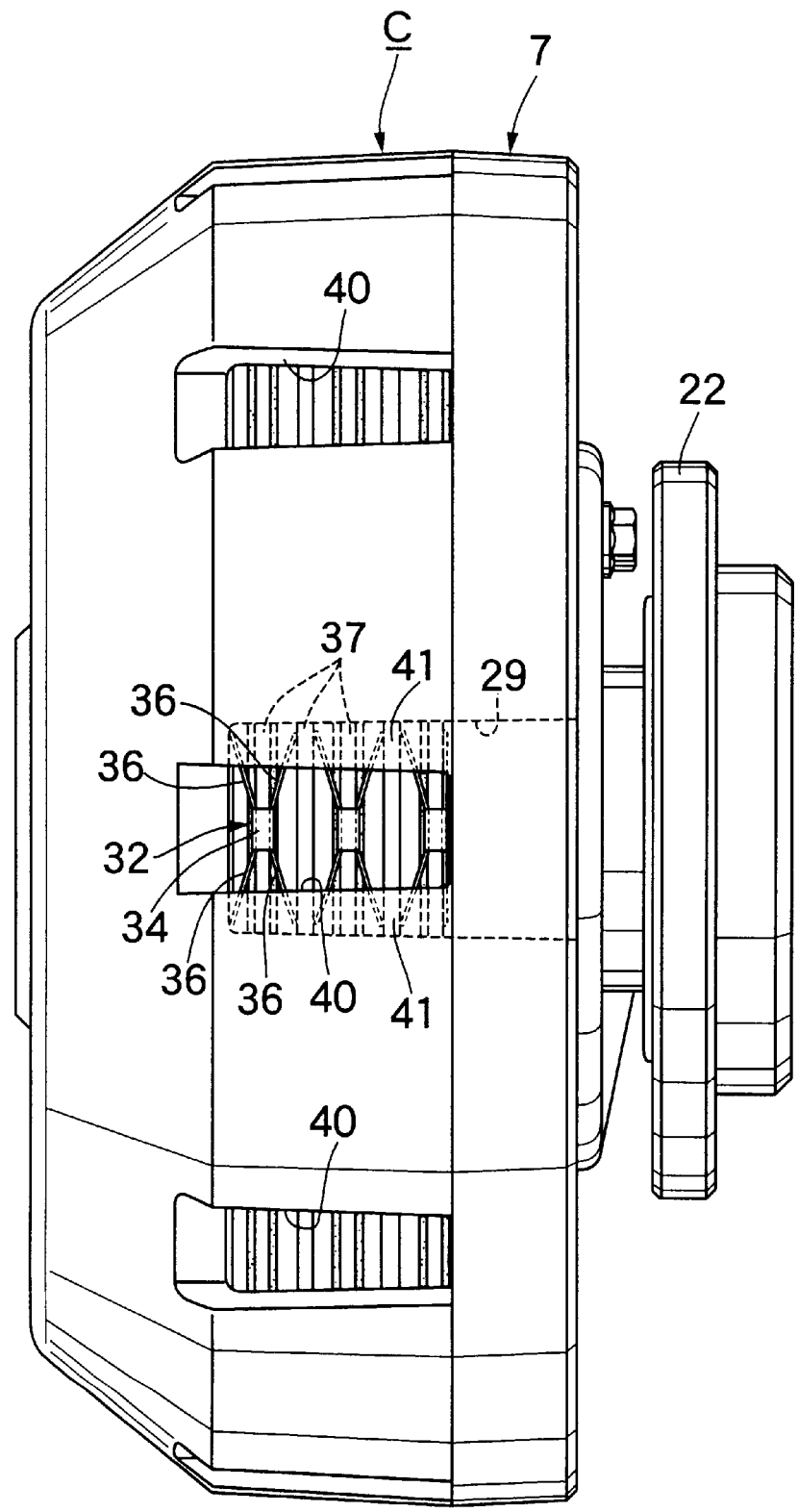
FIG. 3 is a view taken in a direction of an arrow 3 in FIG. 1.
Figure 4:
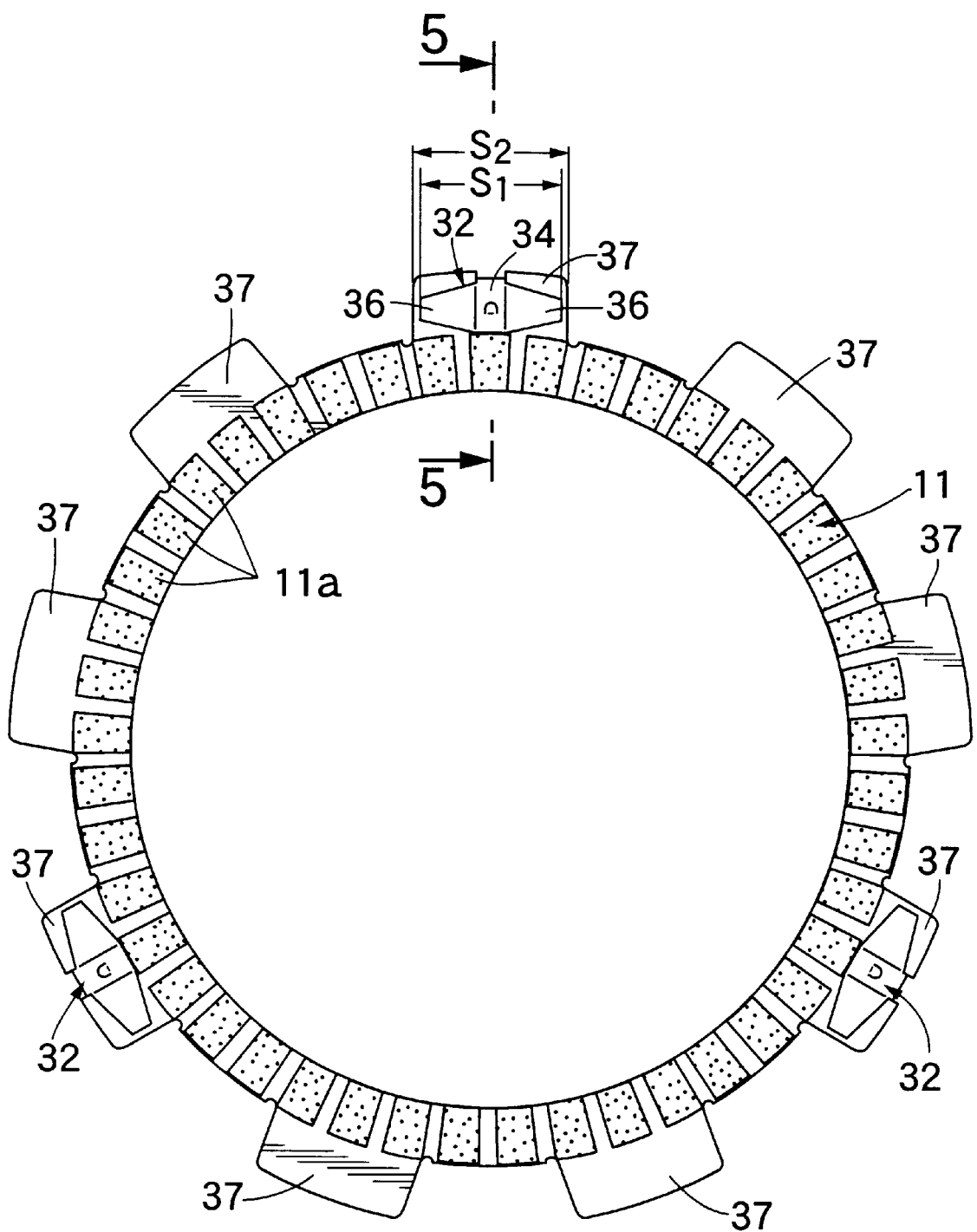
FIG. 4 is a plan view of first friction plates to which first spacing springs are mounted.
Figure 5:
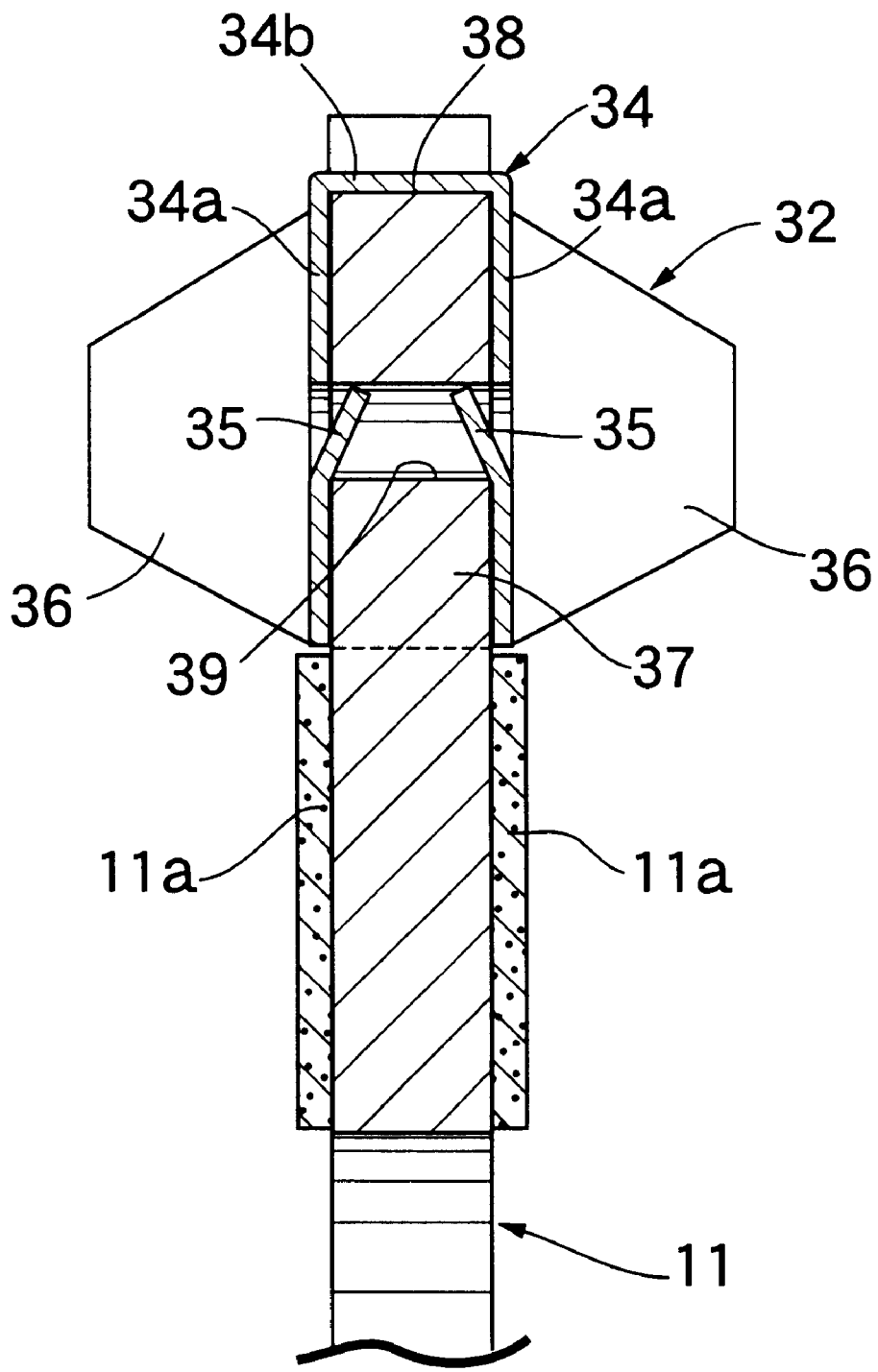
FIG. 5 is an enlarged sectional view taken along a line 5—5 in FIG. 4.
Figure 6:
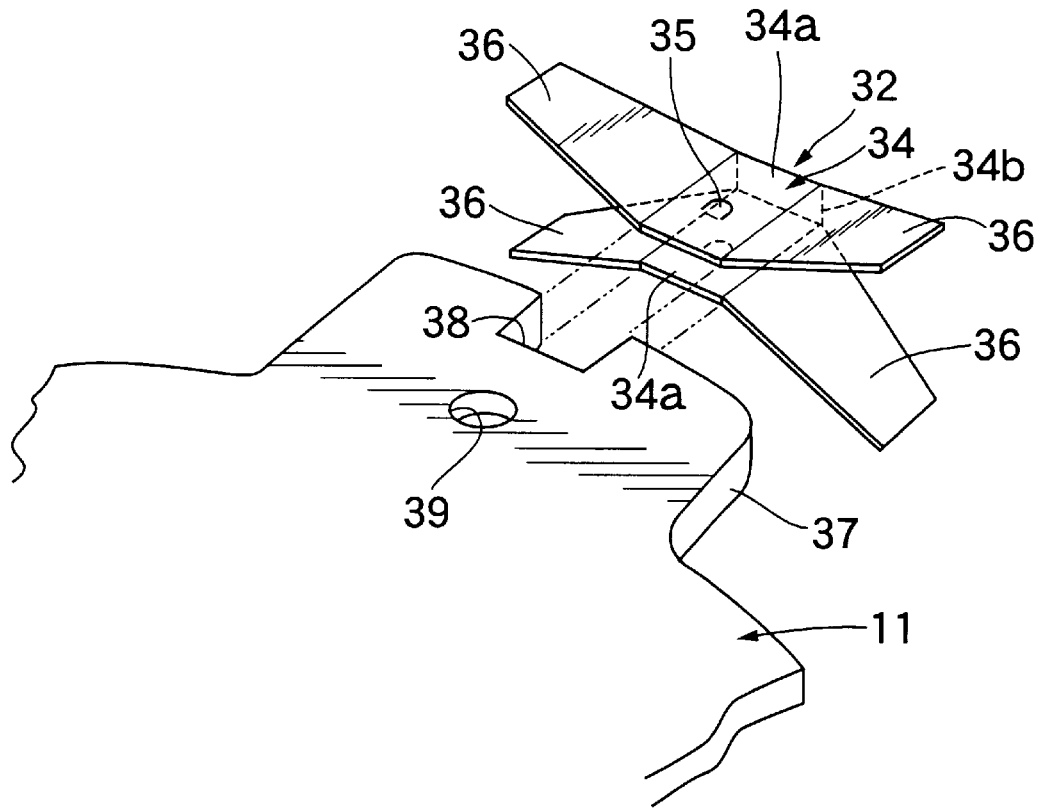
FIG. 6 is an exploded perspective view of the first spacing spring and the mounting structure thereof.

As shown in FIGS. 2 to 4, the first spacing springs 32 are mounted to every other first friction plates 11 and at circumferentially equal distances to a large number of spline teeth 37 of the same first friction plates 11. As shown in FIGS. 4 to 6, the first spacing spring 32 is made of a spring steel plate and includes a U-shaped mounting portion 34 which is comprised of an opposed pair of the side plates 34a integrally connected at one ends thereof to each other through a connecting plate 34b. A locking claw 35 is formed by cutting and rising on each of the side plates 34a of the mounting portion 34 to protrude inwards and obliquely toward the connecting plate 34b. On the other hand, each of the spline teeth 37 of the first friction plate 11 is provided with a notch 38 into which the connecting plate 34b is fitted, and a locking bore 39 into which the locking claw 35 is engaged.

The distance between both the side plates 34a of the mounting portion 34 is set slightly smaller than the thickness of the spline tooth 37. When the spline tooth 37 is inserted between both the side plates 34a, while increasing such distance, the connecting plate 34b is fitted into the notch 38 in the spline tooth 37, and the locking claw 35 is resiliently rushed into the locking bore 39 in the spline tooth 37. Thus, both the side plates 34a clamp the spline tooth 37 by the resilient force, and a tip end of the locking claw 35 is brought into engagement with an inner peripheral surface of the locking bore 39. Therefore, the leaving of the mounting portion 34 from the spline teeth 37 can be inhibited easily.

A pair of resilient blades 36 are integrally connected to opposite side edges of each of the side plates 34a, and extend obliquely in a circumferential direction of the first friction plate 11, i.e., in a direction of a width $S_2$ of the spline tooth 37. Each of the blades 36 is more spaced apart from the spline tooth 37 at a location closer to its tip end. Therefore, one first spacing spring 32 includes two sets of pairs of resilient blades 36.

Each of the resilient blades 36 assumes a trapezoidal shape in which it is gradually narrower in width toward its tip end. A length $S_1$ between tip ends of each pair of resilient blades 36 is set slightly smaller than the width $S_2$ of the spline tooth 37, so that the interference of the resilient blade 36 with the side wall of the spline groove 29 is avoided when the spline tooth 37 is fitted into the spline groove 29 in the clutch outer 7.

The tip end of each of the resilient blades 36 is resiliently put into abutment against that spline tooth 37 of the adjacent first friction plate 11 which has no first spacing spring 32, against the end wall 30 of the spline groove 29, or against retaining ring 31. Thus, when the clutch C is brought into the turned-off state, the first friction plates 11 are pulled to equal distances $L_1$ apart from one another between the end wall 30 and the retaining ring 31. The spring force of each resilient blade 36 is set far smaller than the spring force of the clutch spring 19.

As described above, the first spacing spring 32 can be mounted to the spline teeth 37 of the first friction plate 11 by an extremely simple operation which comprises inserting the spline teeth 37 of the first friction plate 11 into the U-shaped mounting portion 34 of the first spacing spring 32, and this leads a good assemblability. Moreover, the resilient blade 36 extends in a direction of the largest width $S_2$ of the spline teeth 37 of the first friction plate 11 and is gradually narrower in width toward the tip end. Therefore, the length of the resilient blade 36 can be ensured sufficiently within a range of the width $S_2$ of the spline teeth 37, and the spring constant of the resilient blade 36 can be set at a relatively small value. Even if a lining 11a of the first friction plate 11 is worn, an excessive stress generated in the resilient blade 36 can be avoided when the clutch is in the turned-on state in which the first and second friction plates 11 and 12 are in friction engagement with each other, thereby ensuring the durability of the resilient blade 36. Since the first spacing spring 32 includes the two sets of pairs of resilient blades 36 extending from the opposite side edges of both the side plates 34a of the mounting portion 34, the resilient blades 36 can be interposed between the first friction plates 11 only by mounting the first spacing springs 32 to every other first friction plates 11. This can largely contribute to a reduction in cost in cooperation with a small number of steps of assembling the resilient blades 36 and with a simple structure of the first spacing spring 32.

Figure 7:
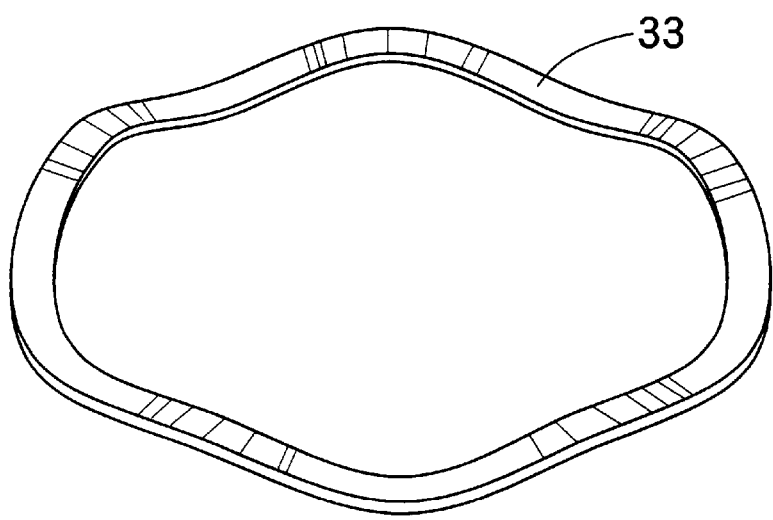
FIG. 7 is a perspective view of a second spacing spring.

On the other hand, second spacing springs 33 are disposed between the pressure receiving plate 13 and the second friction plate 12 for biasing the pressure receiving plate 13 and the second friction plates in spacing directions (see FIG. 2). The second spacing spring 33 comprises an endless annular wavy spring, as shown in FIG. 7. When the clutch C is brought into the turned-off state, the second friction plates 12 and the pressure receiving plate 13 are pulled apart to equal distances $L_2$ by spring forces of the second spacing springs 33. The distance $L_2$ is set to be equal to the distance L, between the first friction plates 11 pulled apart from one another by the first spacing springs 32. The spring force of the second spacing spring 33 is also set far smaller than the spring force of the clutch spring 19. The second spacing springs 33 each comprising the endless annular wavy spring may be fitted over the outer periphery of the clutch inner 8 alternately with the second friction plates 12 and hence, the assemblability of the springs 33 is good and there is not a possibility that the springs may leave the outer periphery of the clutch inner 8 under the action of a centrifugal force. In addition, each of the second spacing springs 33 has a relatively large entire length and has a spring constant which can be set at a relatively small value. Even if the lining 11a of each of the first friction plate 11 is worn, an excessive stress generated in the second spacing spring 33 can be avoided during the clutch turning-on, whereby the durability of the second spacing springs 33 can be ensured.

Thus, when the clutch C is in the turned-on state, the pressing plate 14 and the pressure receiving plate 13 can bring the first and second friction plates 11 and 12 into friction engagement with one another by the biasing force of the clutch spring 19, while flexing the first and second spacing springs 32 and 33.

When the clutch C is brought into the turned-off state, the first friction plates 11 are pulled apart from one another to the equal distances L, between the end wall 30 of the spline groove 29 and the retaining ring 31 by the first spacing springs 32, while the axial movement of the first friction plates 11 is restrained by cooperation of the first spacing springs 32 with the end wall 30 and the retaining ring 31. In addition, the second friction plate 12 and the pressure receiving plate 13 are pulled apart from each other to the equal distance $L_2$ by the second spacing spring 33, and moreover, the distance $L_2$ is set to be equal to the distance $L_1$ between the first friction plates 11 pulled apart from the one another by the first spacing spring 32. Therefore, the first and second friction plates 11 and 12 are pulled apart from one another against the tacking force of the oil and thus, it is possible to reliably prevent the drag between both the friction plates 11 and 12.

Referring to FIG. 3, a window 40 which opens a half of the spline groove 29 at the side of the end wall 30 radially outwards is provided in the peripheral wall of the clutch outer 7 for the purpose of discharging the oil from the spline groove 29 and reducing the weight. In this case, canopies 41 are projectingly provided on side edges of the window 40 to cover tip ends of the resilient blades 36 of the first spacing spring 32. If the locking claws 35 of the first spacing springs 32 should leave the locking bores 39, the canopies 41 exhibit a function of preventing the leaving of the first spacing springs 32 from the spline teeth 37 of the first friction plates 11 by the centrifugal force.

Figure 8:
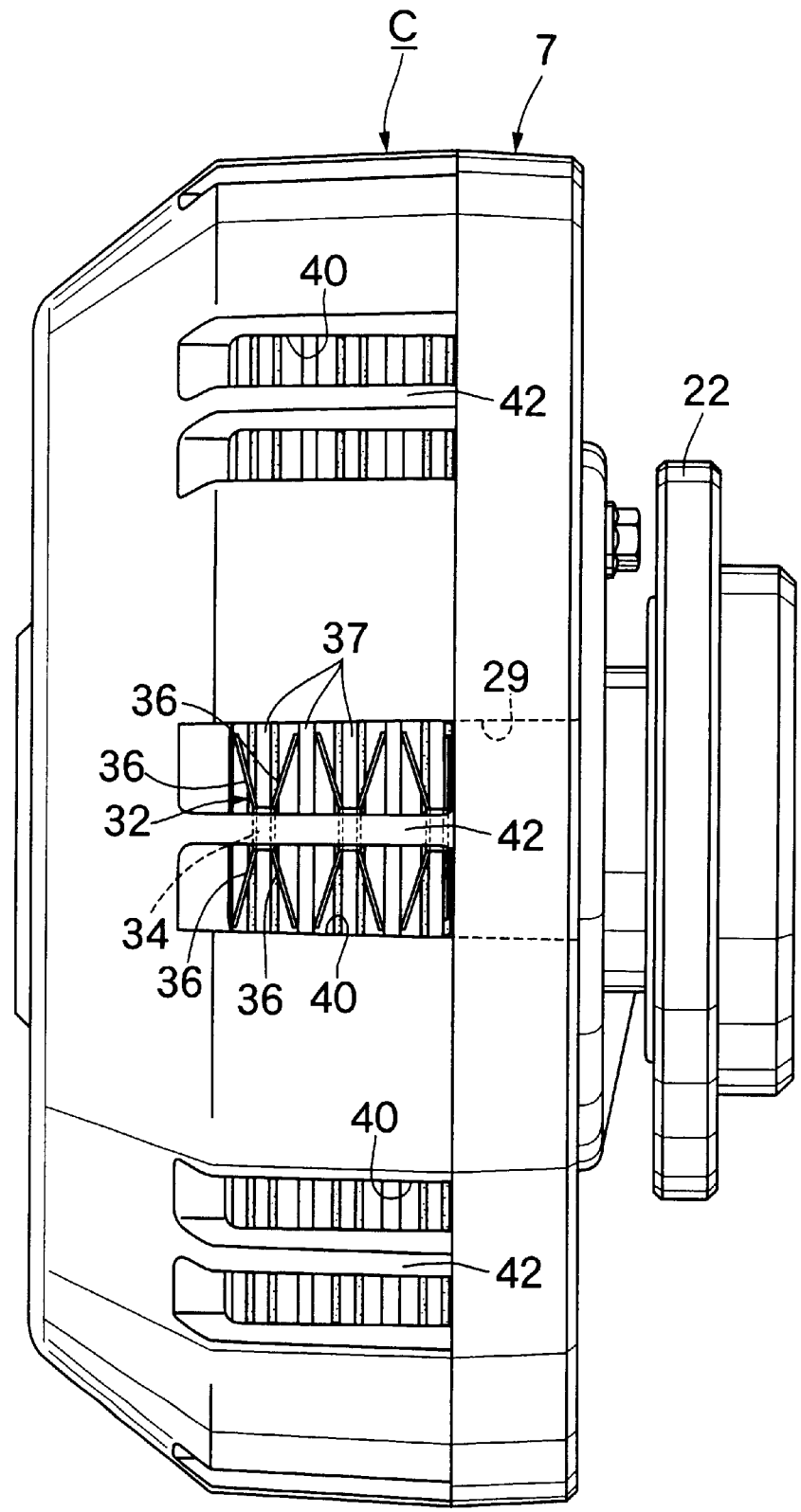
FIG. 8 is a side view corresponding to FIG. 3, but according to a second embodiment of the present invention.

FIG. 8 shows a second embodiment of the present invention, which is of a similar arrangement, except that a rib 42 extending through a central portion of the window 40 is integrally formed on the peripheral wall of the clutch outer 7 in place of the canopies 41. In FIG. 8, portions or components corresponding to those in the previous embodiment are designated by like reference characters, and the description of them is omitted.

In the second embodiment, the rib 42 faces the connecting plates 34b of the mounting portions 34 of the first spacing springs 32. Therefore, if the locking claws 35 of the first spacing springs 32 should leave the locking bores 39, the leaving of the first spacing springs 32 from the spline teeth 37 of the first friction plates 11 by the centrifugal force can be prevented by the rib 42.

Figure 9:
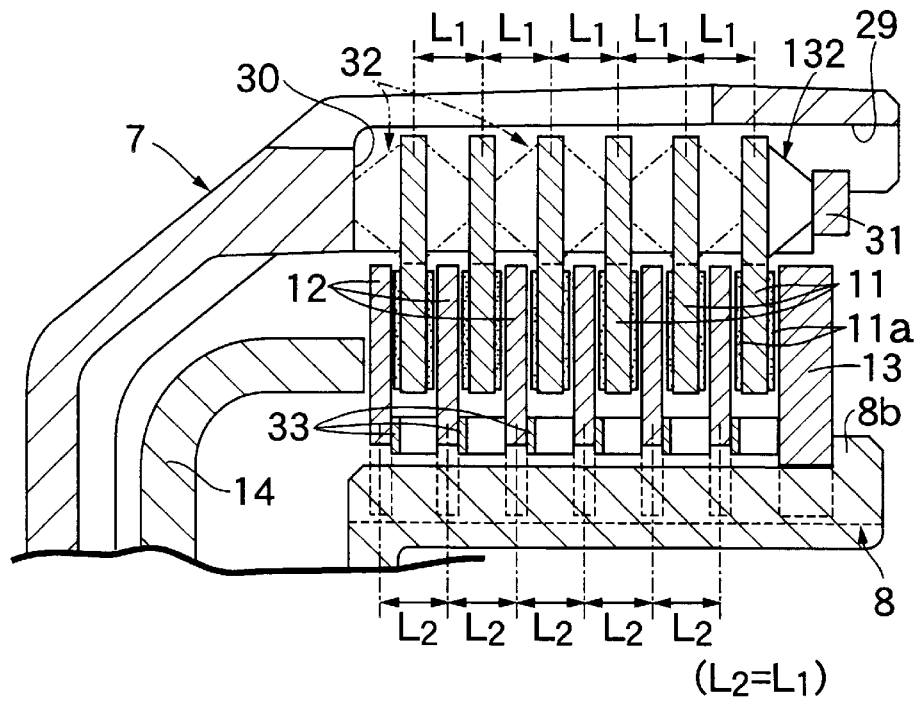
FIG. 9 is a sectional view corresponding to FIG. 2B, but according to a third embodiment of the present invention.
Figure 10:
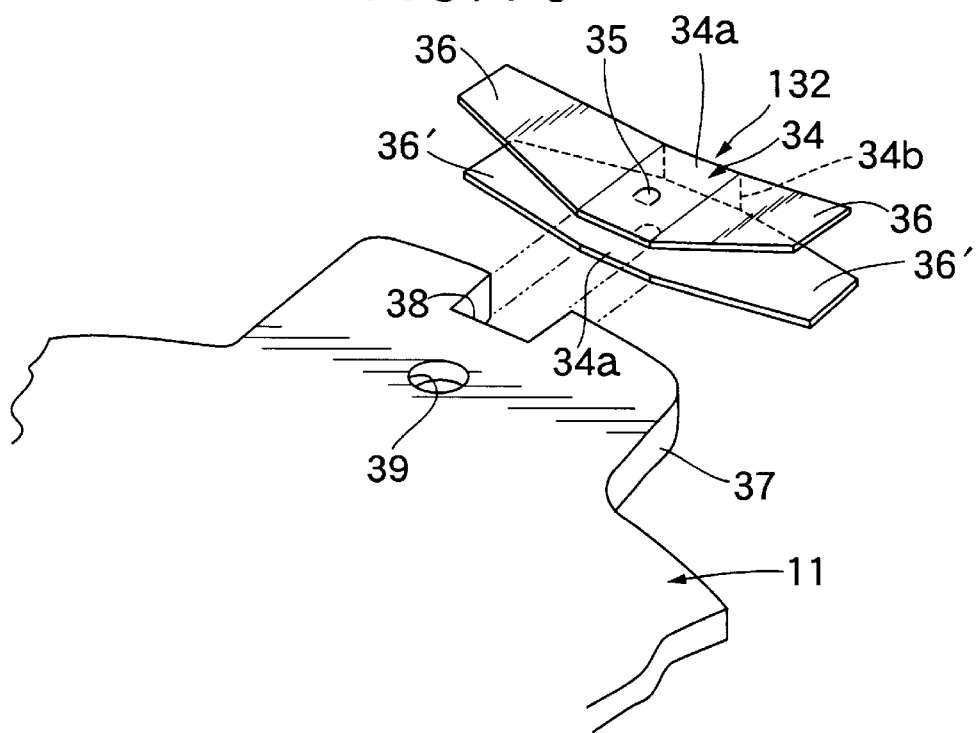
FIG. 10 is an exploded perspective view of a first spacing spring shown in FIG. 9 and the mounting structure thereof.

FIGS. 9 and 10 show a third embodiment of the present invention, which is applicable to the case where even numbers (six in the illustrated embodiment) of first and second friction plates 11 and 12 are provided.

In such case, a modified type of first spacing spring 132 having only a pair of resilient blades 36 capable of abutting against the retaining ring 31 or the end wall 30 of the spline groove 29 in the clutch outer 7 is mounted to spline teeth 37 of the first friction plate 11 located at an innermost or outermost position in the group of the first friction plates 11. This modified type of first spacing spring 132 has the pair of resilient blades 36 formed on one of side plates 34a of its U-shaped mounting portion 34, but a pair of blades 36' on the other side plate 34a are formed on the same plane as the other side plate 34a and deprived of a resilient function. The first spacing spring 32 having two sets of pairs of resilient blades 36 as in the first embodiment is mounted to each of the other first friction plates 11.

However, the modified type of first spacing spring 132 is mounted to the spline teeth 37 lying in a phase different from the phase of the spline teeth 37 having the other first spacing springs 32 mounted thereto, so that the blade 36 deprived of the resilient function does not overlap the resilient blades 36 of the other first spacing springs 32. This is for the purpose of preventing that if the blade 36' deprived of the resilient function overlaps the resilient blades 36 of the other first spacing springs 32, the blade 36' deprived of the resilient function is additionally interposed between resilient contact portions between the end wall 30 of the spline groove 29 and the retaining ring 31 during the clutch turning-off, whereby the distance between the first friction plate 11 pulled apart from one another is slightly deviated from a defined value $L_1$.

The other arrangement is similar to that in the first embodiment and hence, in FIGS. 9 and 10, portions or components corresponding to those in the first embodiment are designated by like reference characters, and the description of them is omitted.

If another modified type of first spacing spring 132 with a pair of blades 36' deprived of a resilient function being cut off from a corresponding side plate 34a is used in the third embodiment, the other modified type of first spacing spring 132 and the first spacing springs 32 can be mounted to the spline teeth 37 lying in the same phase.

Although the embodiments of the present invention have been described in detail, it will be understood that the present invention is not limited to the above-described embodiments, and various modifications may be made without departing from the spirit and scope of the invention defined in claims. For example, the wet multi-plate clutch C can be used in a mode in which a portion thereof has been submerged in the oil. In addition, a stopper means may be provided on the outer peripheral wall of the clutch inner 8 for limiting the axial movement of the group of the second friction plates 12 in a constant range by cooperation with the pressure receiving plate 13, so that the second friction plates 12 are pulled apart from one another to equal distances between the stopper means and the pressure receiving plate 13 by the second spacing springs 33 during the clutch turning-off. In addition, the clutch inner 8 may be connected to the input shaft, and the clutch outer 7 may be connected to the output shaft. A mode may be employed in which the other modified type of first spacing spring 132 with the blades 36' deprived of a resilient function being cut off is mounted to those spline teeth 37 of all the first friction plates 11 which lie in the same phase. Such mode is independent of that the number of the first friction plates 11 is odd or oven.

What is claimed is:

1. A wet multi-plate clutch comprising a clutch outer connected to one of an input member connected to a power source and an output member connected to a loading member, a clutch inner relatively rotatably disposed within said clutch outer and connected to the other of said input and output members, a plurality of first friction plates axially slidably spline-fitted to an inner peripheral wall of said clutch outer and accommodated within said clutch outer, a plurality of second friction plates axially slidably spline-fitted to an outer peripheral wall of said clutch inner and superposed one on another alternately with said first friction plates, and a clamping means capable of clamping groups of said first and second friction plates axially to bring adjacent ones of said first and second friction plates into friction engagement with each other, wherein said wet multi-plate clutch further includes first spacing springs interposed between said first friction plates for pulling said first friction plates apart from one another to equal distances therebetween, when said clutch is brought into a turned-off state in which said clamping means is non-operative, and second spacing springs interposed between said second friction plates for pulling said second friction plates apart from one another to equal distances between the second friction plates which are equal to said distances between said first friction plates, when said clutch is brought into the turned-off state, each of said first spacing springs being comprised of a U-shaped mounting portion for clamping spline teeth of said first friction plate in a direction of thickness of said first friction plate, and a pair of resilient blades which extend in a circumferential direction of said first friction plate from opposite side edges of a side plate of said mounting portion, each of said resilient blades being more spaced apart from said spline teeth at a location closer to a tip end thereof.

2. A wet multi-plate clutch according to claim 1, wherein said pair of resilient blades are connected to the opposite side edges of each of an opposed pair of said side plates of the U-shaped mounting portion in each of said first spacing springs.

3. A wet multi-plate clutch according to claim 1 or 2, wherein said resilient blade is formed into a trapezoidal shape in which said resilient blade is gradually narrower in width toward its tip end.

4. A wet multi-plate clutch according to any one of claim 1 or 2, wherein said spline teeth have a locking bore provided therein, while the side plate of said mounting portion has a locking claw formed thereon by cutting and rising, said locking claw being resiliently engaged into said locking bore, said locking claw being formed so that a tip end thereof is turned toward the tip end of said spline tooth.

5. A wet multi-plate clutch according to any one of claims 1 or 2, wherein said clutch outer is provided with a window which makes a spline groove in the clutch outer open radially outwards, and canopies which protrude from opposed side edges of said window to cover said resilient blades of said first spacing spring from the radial outside.

6. A wet multi-plate clutch according to any one of claims 1 or 2, wherein said clutch outer is provided with a window which makes said spline groove of said clutch outer open radially outwards, and a rib extending through a central portion of said window to cover said mounting portions of said first spacing springs from the radial outside.

7. A wet multi-plate clutch according to claim 1, wherein said clamping means comprises a pressure receiving plate locked to one of said clutch outer and said clutch inner to face an outermost side surface of the groups of said first and second friction plates, a pressing plate axially slidably carried on said clutch inner to face an innermost side surface of the groups of said first and second friction plates, and a clutch spring mounted to said clutch inner to bias said pressing plate toward said pressure receiving plate.

8. A wet multi-plate clutch according to claim 1 or 7, wherein said second spacing spring is formed of an annular wavy spring which is slidably fitted over an outer periphery of said clutch inner.

* * * * *